UNITED STATES PATENT OFFICE.

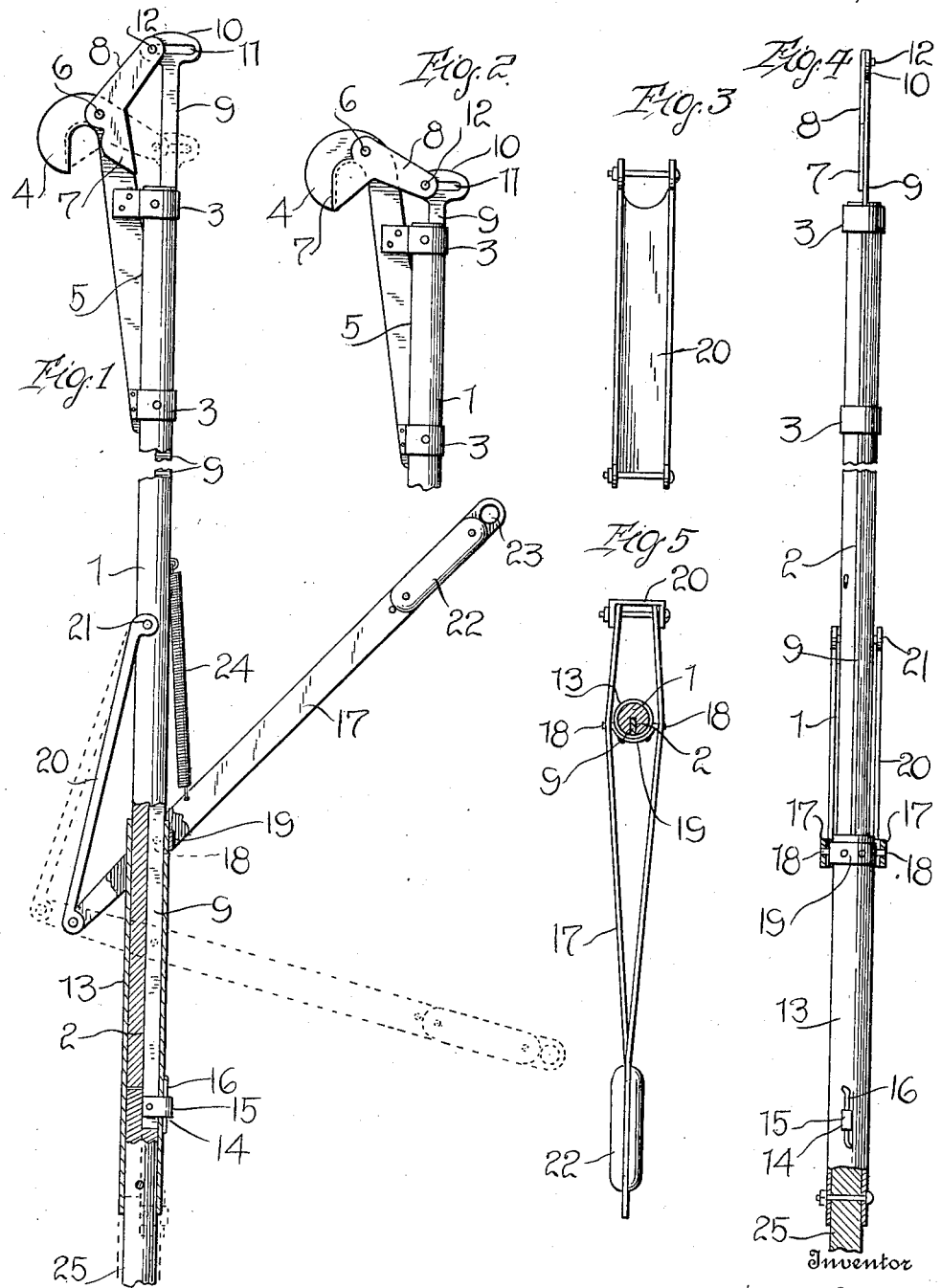
G. N. SPENCER.
PRUNING IMPLEMENT.
APPLICATION FILED FEB. 12, 1913.
1,082,290.
Patented Dec. 23, 1913.
Inventor
GEORGE N. SPENCER

GEORGE NELSON SPENCER, OF FOREST GROVE, OREGON.

PRUNING IMPLEMENT.

1,082,290.   Specification of Letters Patent.   Patented Dec. 23, 1913.

Application filed February 12, 1913. Serial No. 748,014.

*To all whom it may concern:*

Be it known that I, GEORGE N. SPENCER, a citizen of the United States, residing at Forest Grove, in the county of Washington and State of Oregon, have invented certain new and useful Improvements in Pruning Implements, of which the following is a specification, reference being had to the accompanying drawings.

This invention relates to new and useful improvements in pruning implements and has for its object to provide a device of this character which will most efficiently carry out the object for which the same is designed and at the same time require a less amount of labor in accomplishing the desired results.

A further object of the invention resides in providing a pruning clipper in which the knife blade thereof is operated by a straight and vertically movable rod and a still further object resides in providing improved means for reciprocating this movable rod.

A still further object resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claim.

In the accompanying drawing forming a part of this application, Figure 1 is a side elevation of the complete device with parts thereof in section. Fig. 2 is a fragmentary side elevation of the device showing the cutting blade thereof in its closed and effective position. Fig. 3 is a bottom plan view of one of the linking members used on the device. Fig. 4 is a rear elevation of the complete device with parts in section; and Fig. 5 is a plan view of the operating lever showing its connection with the linking member and reciprocating rod, the shaft or pole being disclosed in section.

In describing my invention, I shall refer to the drawing in which similar reference characters designate corresponding parts throughout the several views and in which 1 indicates a pole or shaft which is provided throughout its length with a slot or channel 2 and secured to the upper end of said shaft in spaced relation, and one below the other, are the bands 3. These bands have ears or the like formed thereon, to which is secured the shank of a hook or limb-engaging member 4 and the one side edge of this shank member referred to, is beveled, as shown at 5, whereby said member 4, when properly secured in position will be disposed outwardly at an angle to the shaft or pole 1. The hooked portion of the member 4, while extending outwardly from the plane of the pole or shaft 1, is disposed slightly above the upper end of the latter and fulcrumed at a point 6 on the hook member 4, is a knife blade or the like 7 which is adapted to coöperate with the sharpened edge of the hook member for the purpose of pruning trees and the like. This knife blade has an angular shank 8 formed thereon whereby the same may be engaged by an operating means for disposing the knife blade to its effective and ineffective positions. I have provided an improved operating means for this knife blade and to this end, I provide a thin flat metal rod 9, the same being slidably disposed in the slot 2 of the pole or shaft 1. The upper end of this rod 9 is enlarged as shown at 10 and provided with a horizontal slot 11 and a pin or the like 12 which is extended transversely through the free end of the shank 8 is operatively disposed through said slot 11. This rod 9, being fitted in the slot 2, of the shaft or pole 1, is retained in position in the latter at its upper end through the medium of the bands 3 and additional means to be hereinafter described, is provided for retaining the lower end of said rod in position.

Loosely applied to the lower end of the shaft or pole 1, is a sleeve or tubular member 13 which has a slot or the like 14 formed in the wall thereof, adjacent its lower end. A piece of looped metal 15 which is secured to the lower end of the rod 9, is disposed through this slot 14 and a pin 16 or other flexible member such as a wire is disposed through the loop or the outer face of the sleeve 13 to retain said rod in engagement therewith. This sleeve or tubular member 13 being loosely applied to the lower end of the shaft or pole 1 may be readily reciprocated thereon to reciprocate said rod 9 and correspondingly operate the knife blade 7.

I have provided means for retaining the knife blade normally in its open position and in connection therewith, I have also provided a means for operating the knife blade through the medium of a fulcrumed means whereby the device may be used for engagement with larger elements. To this end, a lever 17 is provided, the same comprising a pair of side bars which are pivoted adjacent one end thereof on studs or the like 18 of a collar 19 secured to the upper end of the sleeve member 13. The bars which form this lever, therefore, straddle the upper end of the sleeve member 19 and the one end of said lever is fulcrumed to the lower end of a linking bar or the like 20, the upper end of said latter member being in turn pivoted at a point 21, to the pole or shaft 1, about mid-way of its ends. The extreme outer or free end of the lever 17 is provided with a handle member 22 and an eye 23 is formed in said lever just beyond said handle member, the purpose of which will be hereinafter and more particularly described. Also engaged with said lever 17 at a point between the pivotal point 18 and the handle 22, is one end of a coil spring 24, the opposite end of said coil spring being secured to the pole or shaft 1 just above the point 21. Also secured to the lower end of the sleeve 13 is an extension shaft or pole 25, whereby the device may be used in connection with very tall trees.

In operation, when it is desired to sever a limb or branch from a tree, the device is raised and the hook member 4 engaged with the particular limb or branch to span the same, it being understood, of course, that the knife blade is held normally in its ineffective position, as shown in Fig. 1 of the drawing. If this limb or branch to be severed is of small or medium size, it will only be necessary for the operator to pull downwardly upon the sleeve or tubular member 13, which operation will obviously draw the rod 9 downwardly and swing the shank 8 of the blade 7 in an arc of a circle, this arc being disclosed in dotted lines in Fig. 1 of the drawing. It will here be stated that the rod 9 is straight throughout its length, but the movement of this shank 8 in an arc of a circle, is compensated for by the provision of the slot 11 in the upper end of said rod 9 and upon the downward movement of said rod, it will be understood that the cutting blade will engage the limb or branch and sever the same. Upon releasing the sleeve or tubular member 13, the latter will be drawn upwardly to its normal position by the coil spring 24 which is engaged with the lever 17, the latter being in turn pivotally engaged with the sleeve 13. If during the operation of the device, it is desired to sever a limb of slightly larger dimensions, than can be severed through the ordinary pull on the sleeve 13, the operator, of course, uses the lever 17 in drawing the rod 9 downwardly and correspondingly disposing the knife blade to its effective position. Since this lever is fulcrumed, it is obvious that a great amount of pull may be applied to the rod 9 with a less amount of energy than is required to be applied to the sleeve member 13, which is in direct alinement with the rod 9. Should it be desired to remove a limb or branch from a tree which is of extreme height, the extension rod 25 may be secured to the sleeve member 13 but, under ordinary conditions, said member 25 is not necessary. When this extension rod 25 is used, a chain or other flexible connection (not shown), may be engaged with the eye 23 on the end of the lever 17 to operate the latter.

From the foregoing it will be seen that I have provided a simple, inexpensive and efficient means for carrying out the objects of the invention and while I have particularly described the elements best adapted to perform the functions set forth, it is obvious that various changes in form, proportion and in the minor details of construction may be restorted to without departing from the spirit or sacrificing any of the principles of the invention.

Having thus described this invention, what I claim is:—

In a pruning implement, the combination with a pole, cutting mechanism mounted thereon and a reciprocating rod mounted on said pole and connected with said cutting mechanism, of a sleeve loosely applied to the lower end of said pole and connected with the lower end of said rod, a lever pivoted on said sleeve member adjacent the upper end thereof, a linking member pivoted at its one end to said pole and the opposite end thereof fulcrumed to the end of said lever and a coil spring member having one of its ends engaged with said lever at a point between its pivotal point and its handle and the opposite end secured to said pole at a point slightly above the pivotal point of said link member whereby to normally retain said lever in its raised position to correspondingly dispose the knife blade to its ineffective position.

In testimony whereof I hereunto affix my signature in the presence of two witnesses.

GEORGE NELSON SPENCER.

Witnesses:
 ED. RUSTIN,
 CHRIS JENSEN.

---

Copies of this patent may be obtained for five cents each, by addressing the "Commissioner of Patents, Washington, D. C."